(12) United States Patent
Perkins

(10) Patent No.: US 9,101,087 B2
(45) Date of Patent: Aug. 11, 2015

(54) GROUND GROOMER FOR A ROPING SIMULATOR

(71) Applicant: Matt Perkins, Hooper, UT (US)

(72) Inventor: Matt Perkins, Hooper, UT (US)

( * ) Notice: Subject to any disclaimer, the term of this patent is extended or adjusted under 35 U.S.C. 154(b) by 153 days.

(21) Appl. No.: 13/889,638

(22) Filed: May 8, 2013

(65) Prior Publication Data

US 2014/0332241 A1 Nov. 13, 2014

(51) Int. Cl.
*A63B 67/00* (2006.01)
*A01B 23/00* (2006.01)
*A01B 37/00* (2006.01)
*A63B 69/00* (2006.01)

(52) U.S. Cl.
CPC ............. *A01B 37/00* (2013.01); *A63B 69/0068* (2013.01)

(58) Field of Classification Search
CPC ......... A01B 49/02; A01B 19/02; A01B 35/04
USPC .......... 273/359, 366–370; 172/650, 655, 636, 172/661
See application file for complete search history.

(56) References Cited

U.S. PATENT DOCUMENTS

| 568,866 | A | * | 10/1896 | McCauly | 172/671 |
|---|---|---|---|---|---|
| 1,401,332 | A | * | 12/1921 | Green | 172/661 |
| 1,910,290 | A | * | 5/1933 | Johnson | 172/688 |
| 2,299,334 | A | * | 10/1942 | Matter | 172/532 |
| 2,654,197 | A | * | 10/1953 | Peterson | 172/688 |
| 2,925,872 | A | * | 2/1960 | Darnell | 172/448 |
| 3,135,339 | A | * | 6/1964 | Fry et al. | 172/413 |
| 3,974,799 | A | * | 8/1976 | Parsons | 273/336 |
| 4,073,346 | A | * | 2/1978 | Groth et al. | 172/439 |
| 4,662,642 | A | * | 5/1987 | Archibald et al. | 273/339 |
| 5,709,386 | A | * | 1/1998 | Nelson | 273/370 |
| 5,911,279 | A | * | 6/1999 | Whitener | 172/668 |
| 6,736,399 | B1 | * | 5/2004 | Copenhaver | 273/339 |
| 6,739,404 | B2 | | 5/2004 | Keigley | |
| 6,945,534 | B1 | * | 9/2005 | Lindsey | 273/359 |
| 7,430,990 | B1 | * | 10/2008 | Copenhaver | 119/839 |
| 7,478,682 | B1 | * | 1/2009 | Keigley | 172/145 |
| 7,540,331 | B1 | * | 6/2009 | Keigley | 172/195 |
| 8,297,980 | B2 | * | 10/2012 | Reynolds | 434/225 |
| 8,720,894 | B2 | * | 5/2014 | Whitaker | 273/359 |
| 2006/0170163 | A1 | | 8/2006 | Perkins | |
| 2012/0006572 | A1 | | 1/2012 | Adams | |
| 2012/0211247 | A1 | | 8/2012 | Lorenz | |
| 2013/0008675 | A1 | | 1/2013 | Gendelman | |

* cited by examiner

*Primary Examiner* — Mark Graham
(74) *Attorney, Agent, or Firm* — Inventive Patent Law P.C.; Jim H. Salter

(57) ABSTRACT

A ground groomer configured for roping simulators is disclosed. Example embodiments include: a generally horizontal main support member; an attachment pin coupled generally orthogonally to the main support member, the attachment pin being configured for attachment to a ski of a roping simulator; and a plurality of tines arranged to protrude through a lower surface of the main support member to scarify soil behind the skis of the roping simulator.

21 Claims, 11 Drawing Sheets

GROUND GROOMER FOR A ROPING SIMULATOR

BACKGROUND

Copyright Notice

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the disclosure herein and to the drawings that firm a part of this document: Copyright 2012-2013, Matt Perkins, All Rights Reserved.

1. Technical Field

This disclosure relates to ground grooming assemblies, and more specifically to ground groomers configured for roping simulators.

2. Related Art

Roping dummies, roping simulators, or roping training devices (herein simulators) are designed to replicate live cattle run patterns and provide a controlled environment for horse training. These roping simulators, such as those distributed by Heel-o-Matic™, Hot-Heels™, Time-Machine™, and Smarty the Steer™, among a variety of distributors, assist in training ropers to develop roping skills, particularly for hind leg roping, called "heeling". Interest in developing leg roping skills is increasing as a result of a growing interest in roping competition. Also, leg roping skills continue to be important for bull handling, calf branding and other cattle ranching activities.

Because of the mechanics of steer movement, heeling requires split second timing and is commonly thought to be considerably more difficult than roping the head of the steer. Therefore, it is important for a roper responsible for roping the hind legs, the heeler, to have an opportunity to engage in a considerable amount of repetitious practice. Thus, the simulator was developed to assist in roping practice.

Most conventional roping simulators are devices including a sled on which a replica of a steer with hind legs is attached. The sled is adapted for pulling across the ground of a practice area with a tow vehicle. The roper can practice roping the hind legs of the steer replica as the sled is towed. The sled is also commonly fitted with skis or skids that support the sled and contact the ground as the sled is towed around a practice area. Unfortunately, the skis on the sled tend to compact the surface of the practice area as the sled moves across the ground. The compaction of the ground can create slick areas, which can cause cattle and horses to lose their footing. Existing systems do not provide an apparatus that can groom the surface of the ground behind a roping simulator and counteract the undesirable compaction effects of the skis or tires of the roping simulator.

BRIEF DESCRIPTION OF THE DRAWINGS

Embodiments illustrated by way of example and not limitation in the figures of the accompanying drawings, in which.

DETAILED DESCRIPTION

A ground groomer configured for roping simulators is disclosed. However, it is understood that embodiments may be practiced without the specific details disclosed herein. In other instances, well-known processes, structures and techniques have not been shown in detail in order not to obscure the clarity of this description. Various embodiments are described below in connection with the figures provided herein.

Description of an Example Embodiment

Figure 1:
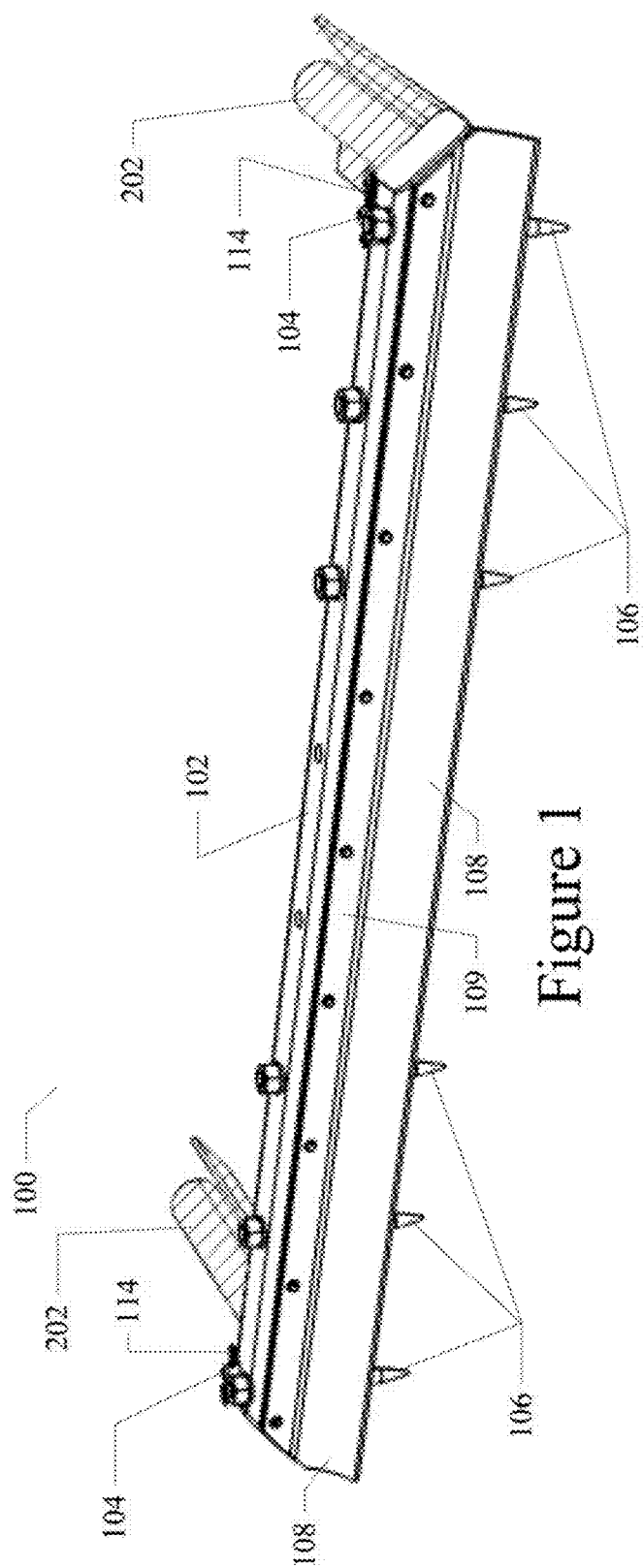
FIG. 1 illustrates a rear isometric view of an example embodiment of the ground groomer configured for roping simulators.
Figure 8:
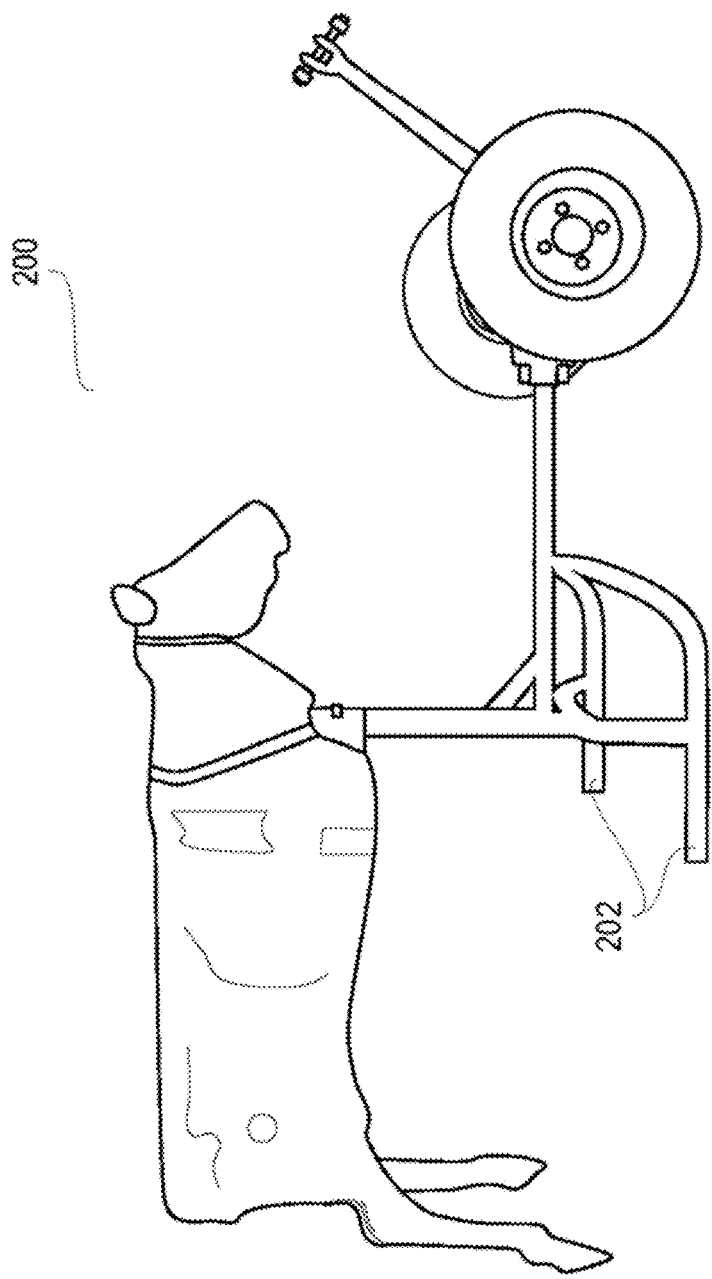
FIG. 8 illustrates a standard roping simulator to Which an example embodiment can be removably attached.

In the various embodiments described herein, a ground groomer configured for roping simulators is provided. Referring now to FIG. 1, a particular embodiment 100 of the ground groomer is illustrated. An example of a standard roping simulator 200 to which the example embodiment 100 described herein can be removably attached is shown in FIG. 8. As shown in FIG. 8 and as commonly included as a component of the standard roping simulator 200, a pair of skis or skids 202 are provided on the roping simulator 200 to support and stabilize the roping simulator 200 as the device is towed around a roping practice area. Unfortunately, the skis 202 on the roping simulator 200 tend to compact the surface of the practice area as the device moves across the ground. The tires of the roping simulator 200 can also cause this undesirable effect to the top surface of the practice area. The compaction of the ground in the practice area can create slick areas, which can cause cattle and horses to lose their footing.

Figure 2:
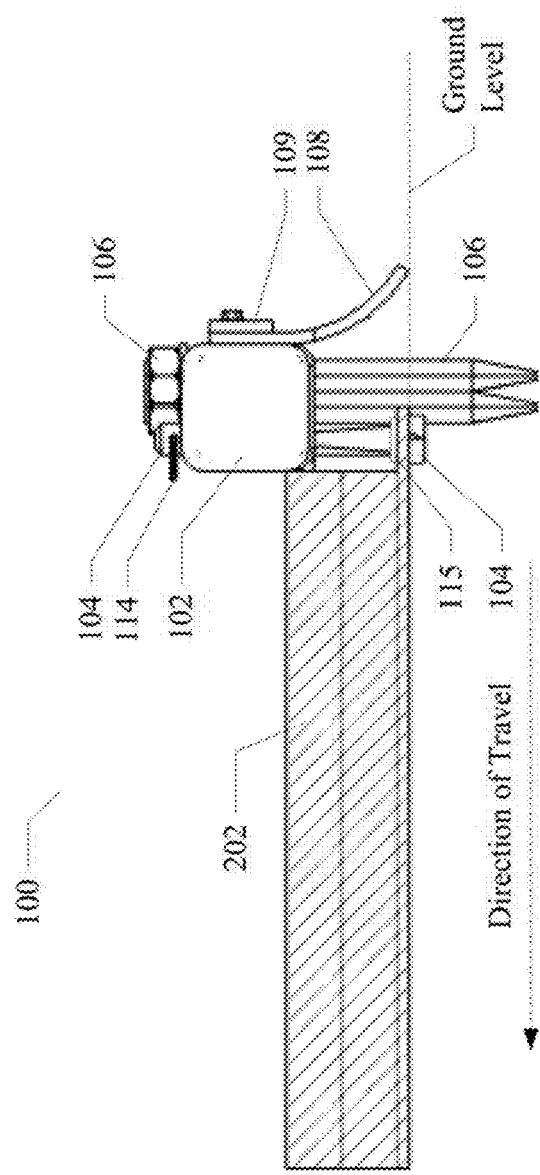
FIG. 2 illustrates a left side view of an example embodiment of the ground groomer configured for roping simulators.
Figure 4:
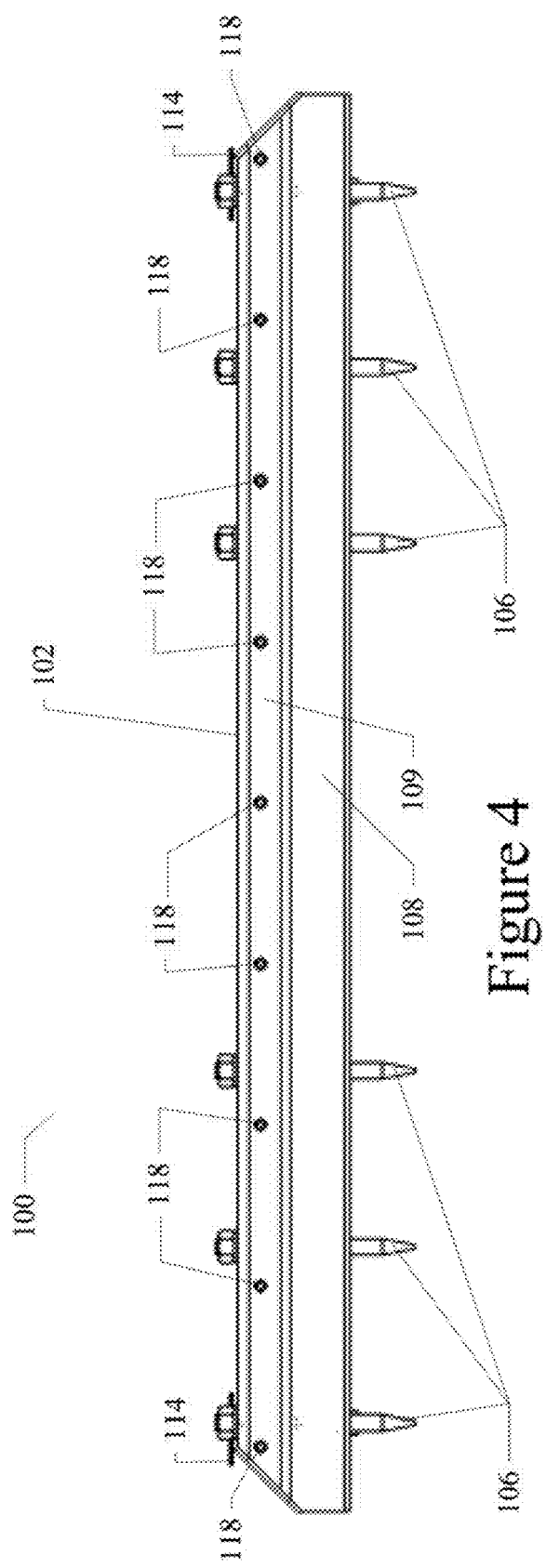
FIG. 4 illustrates a rear view of an example embodiment of the ground groomer configured for roping simulators.

Referring again to FIG. 1, as particular embodiment 100 of the ground groomer can be removably attached to the skis 202 of a standard roping simulator 200. The ground groomer 100 counteracts the compaction of the ground in the practice area caused by the roping simulator 200. FIG. 1 illustrates a rear isometric view of an example embodiment of the ground groomer 100 configured for roping simulators. Note that in the diagrams provided herein, the skis 202 do not form a part of the claimed embodiments and thus are shown as shaded or cross-hatched elements. In general, the ground groomer 100 of an example embodiment comprises a generally horizontal main support member 102, a pair of attachment pins 104 coupled generally orthogonally to the main support member 102 and the surface of the ground, the attachment pins 104 being configured for attachment to a ski 202 of a roping simulator, and a plurality of tines 106 protruding from a lower surface of the main support member 102 to scarify soil behind the skis and tires of the roping simulator. The main support member 102 can be fabricated as a flat bar, an L-shaped bar, a square or rectangular tube (e.g., see the example embodiment of FIG. 9), a circular or oval tube, or other equivalent configuration, which provides structural support for the attachment pins 104 and the tines 106. In the example embodiment, a flexible shield 108 can be attached to a rear surface of the main support member 102 to prevent flying debris and to smooth and flatten the scarified soil behind the tines 106. The flexible shield 108 can be fabricated from a stiff rubber or semi-rigid and flexible synthetic material. The flexible shield 108 can be attached to a rear surface of the main support member 102 using as flat stock steel plate 109 to secure the flexible shield 108 to the main support member 102 with small screws, bolts, or rivets as shown in FIGS. 1, 2 and 4. The tines 106 can be removably attached to the main support member 102 through holes in a top surface of the main support member 102. The tines 106 can protrude through as lower surface of the main support member 102 and into the surface of the ground. In various embodiments, the length of the tines 106 can be varied to provide differing levels or depths of scarification behind the ground groomer 100. Additionally, the quantity of tines 106 inserted through the main support member 102 can be varied to provide differing levels or patterns of scarification behind the ground groomer 100. Note that in the example embodiments shown and described herein, at least one tine 106 is positioned directly behind each of the skis 202 of the roping simulator 200. As a result, the operation of the ground groomer 100 serves to counteract the compaction of the ground in the practice area caused by the skis 202 of the roping simulator 200.

FIG. 2 illustrates a let side view of an example embodiment 100 of the ground groomer configured for roping simulators. This view shows the ground groomer 100 as attached to the skis 202 of the roping simulator using the attachment pins 104. Each attachment pin 104 can be inserted through a bole in the bottom of ski 202 of the roping simulator and through a corresponding hole(s) in the main support member 102. A cotter pin 114 (or other equivalent attachment mechanism) can be used to secure the attachment pin 104 in place as shown in FIG. 2. A retaining washer 115 can be used with the attachment pins 104 and placed between a top surface of the ski 202 and a bottom surface of the main support member 102, as shown in FIG. 2, to keep cotter pin 114 in place when the ground groomer 100 is removed.

FIG. 2 also illustrates the position of the tines 106 relative to the surface of the ground (ground level). Note that tines 106 are arranged generally perpendicularly to ground level and extending a configurable distance below ground level. As described above, the variability of the length of the tines 106 can be used to adjust the depth to which the tines 106 extend into the surface of the ground. As the ground groomer 100 is towed across the practice area with the roping simulator 200 in the indicated direction of travel, the tines 106 dig into the surface of the ground and scarify the surface. The flexible shield 108, attached to a rear surface of the main support member 102, drags behind the ground groomer 100 across the surface of the ground. The flexible shield 108 serves to smooth and flatten the scarified soil behind the tines 106 and to prevent debris from flying out behind the ground groomer 100.

Figure 3:
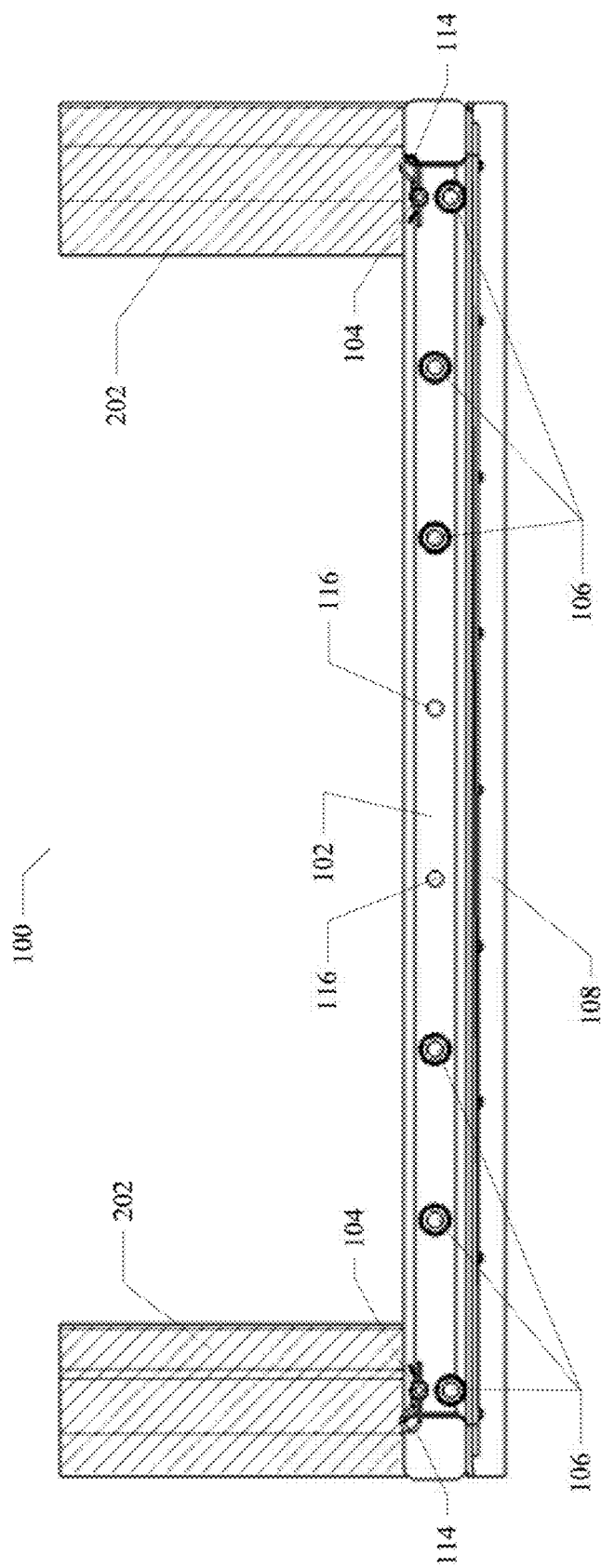
FIG. 3 illustrates a top view of an example embodiment of the ground groomer configured for roping simulators.

FIG. 3 illustrates a top view of an example embodiment 100 of the ground groomer configured for roping simulators. This view illustrates the inserted attachment pins 104 and the cotter pins 114 securing the attachment pins 104 in place. The placement of the attachment pins 104 serves to keep the ground groomer 100 securely yet removably attached to the skis 202. FIG. 3 also illustrates the holes 116 provided in the top surface of the main support member 102 through which the tines 106 may be inserted. As described above, the quantity of tines 106 inserted into the main support member 102 can be varied to produce a differing level and pattern of scarification in the soil behind the ground groomer 100. Note that in the example embodiment shown in FIG. 3, at least one tine 106 is positioned directly behind each of the skis 202 of the roping simulator 200.

FIG. 4 illustrates a rear view of an example embodiment 100 of the ground groomer configured for roping simulators. FIG. 4 illustrates the positioning of the tines 106 penetrating through and being secured to the top surface of the main support member 102 in the example embodiment. FIG. 4 also illustrates how the flexible shield 108 can be attached to a rear surface of the main support member 102 with small screws, bolts, or rivets 118 as shown.

Figure 5:
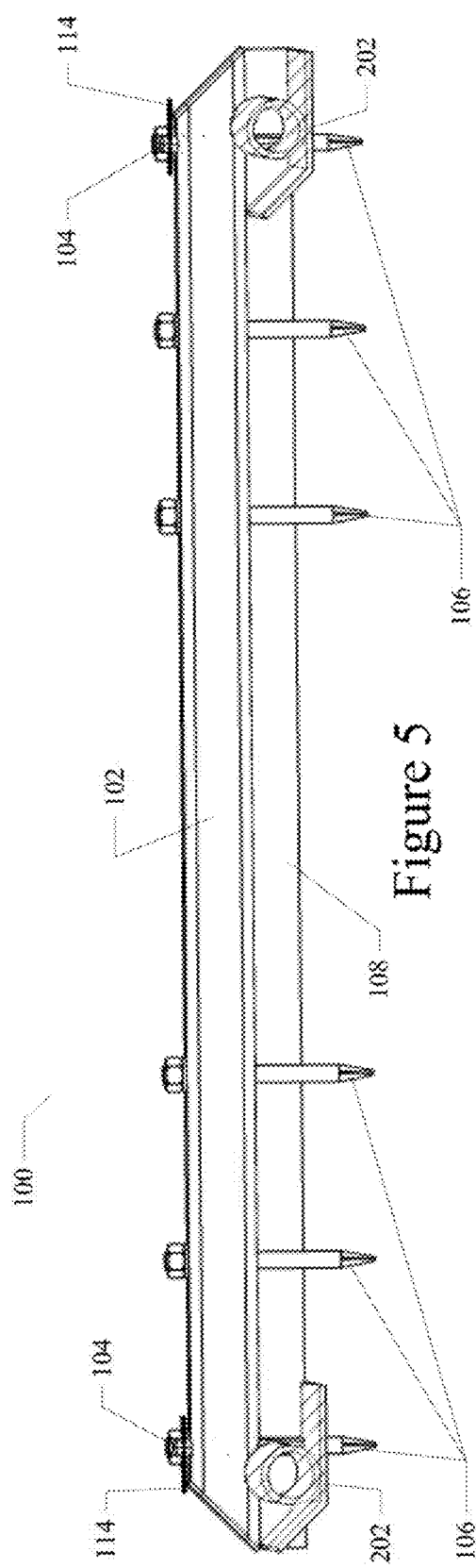
FIG. 5 illustrates a front view of an example embodiment of the ground groomer configured for roping simulators.

FIG. 5 illustrates a front view of an example embodiment 100 of the ground groomer configured for roping simulators. As shown, the ground groomer 100 is removably attached to skis 202 via the attachment pins 104 and cotter pins 114. FIG. 5 also illustrates the positioning of the tines 106 in the top surface of the main support member 102 and extending below a lower surface of the skis 202.

Figure 6:
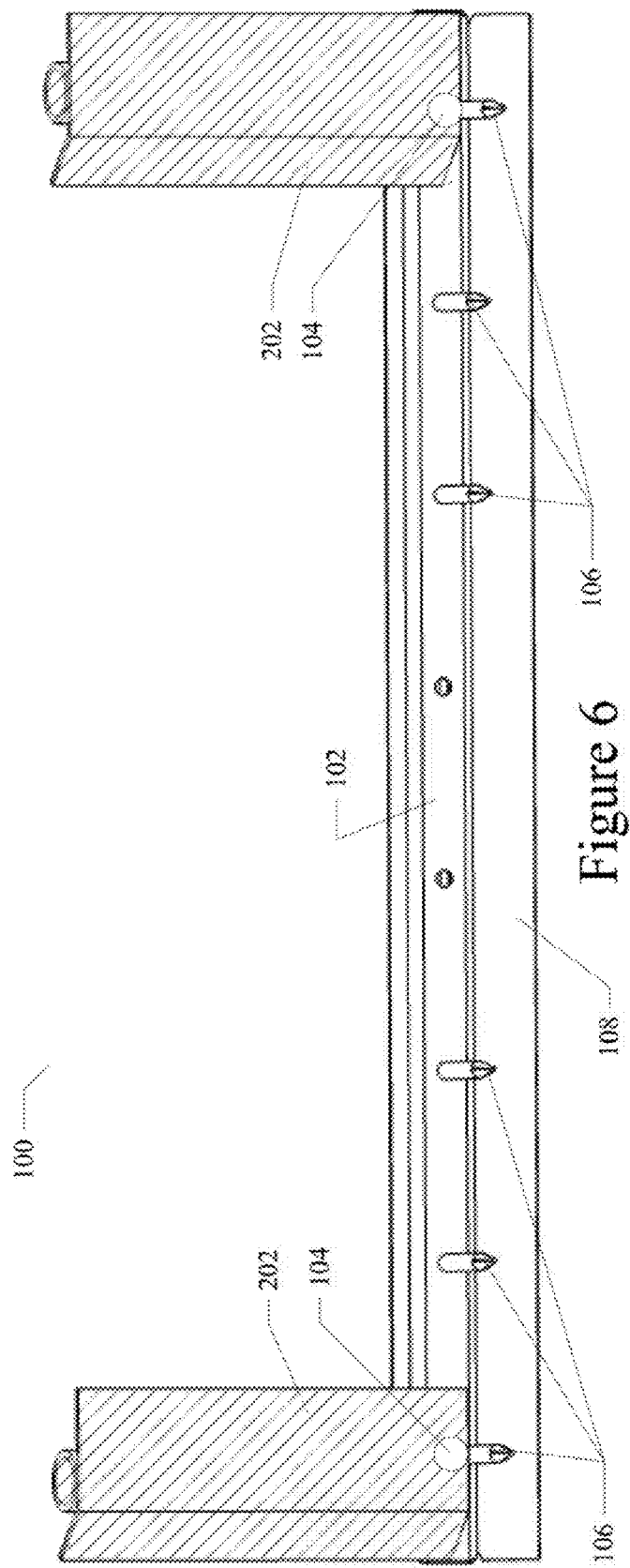
FIG. 6 illustrates as bottom view of an example embodiment of the ground groomer configured for roping simulators.

FIG. 6 illustrates a bottom view of an example embodiment 100 of the ground groomer configured liar roping simulators. As in FIG. 5, FIG. 6 also shows the ground groomer 100 as removably attached to skis 202 via the attachment pins 104. FIG. 6 also illustrates the positioning of the tines 106 in the top surface of the main support member 102 and extending below a bottom surface of the main support member 102.

Figure 7:
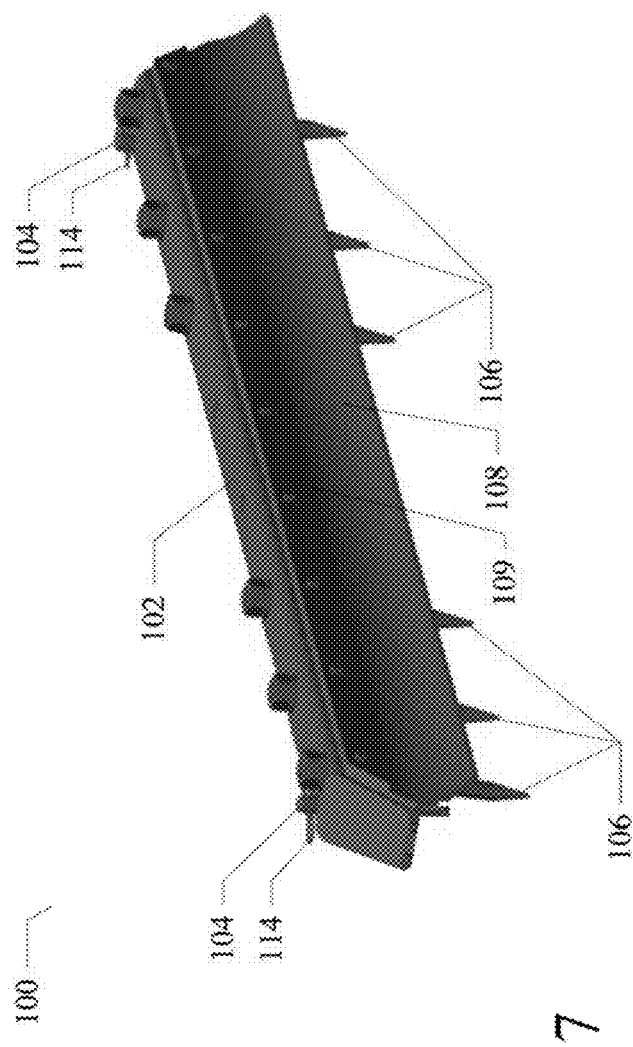
FIG. 7 illustrates a shaded rear isometric view of an example embodiment of the around groomer configured for roping simulators.

FIG. 7 illustrates a shaded rear isometric view of an example embodiment 100 of the ground groomer configured for roping simulators. FIG. 7 illustrates the ground groomer 100 without an attached roping simulator. As shown, the ground groomer 100 of an example embodiment comprises a generally horizontal main support member 102, a pair of attachment pins 104 coupled generally orthogonally to the main support member 102 and the surface of the ground, the attachment pins 104 being configured for attachment to a ski 202 of a roping simulator, and a plurality of tines 106 protruding through a top surface of the main support member 102 to scarify soil behind the skis and tires of a roping simulator. In the example embodiment shown in FIG. 7, a flexible shield 108 can be attached to a rear surface of the main support member 102 to prevent flying debris and to smooth and flatten the scarified soil behind the tines 106.

FIG. 8 illustrates a standard roping simulator 200 to which an example embodiment can be removably attached. As shown in FIG. 8 and as commonly included as a component of the standard roping simulator 200, a pair of skis or skids 202 are provided on the roping simulator 200 to support and stabilize the roping simulator 200 as the device is towed around a roping practice area. As described above, the ground groomer 100 of an example embodiment is configured for removable attachment directly to the skis 202 of the standard roping simulator 200. No significant modification needs to be made to the roping simulator 200. Because the ground groomer 100 of an example embodiment is configured for removable attachment directly to the skis 202 of the roping simulator 200, the ground groomer 100 rides lowly to the ground and does not interfere with the heeler attempting to rope the back legs of the simulated animal of the roping simulator 200. Additionally, as described above, the ground groomer 100 of an example embodiment scarifies, smoothes, and flattens the soil behind the roping simulator 200 and thus improves the surface of the practice area for the heeler riding behind the roping simulator 200.

Figure 9:
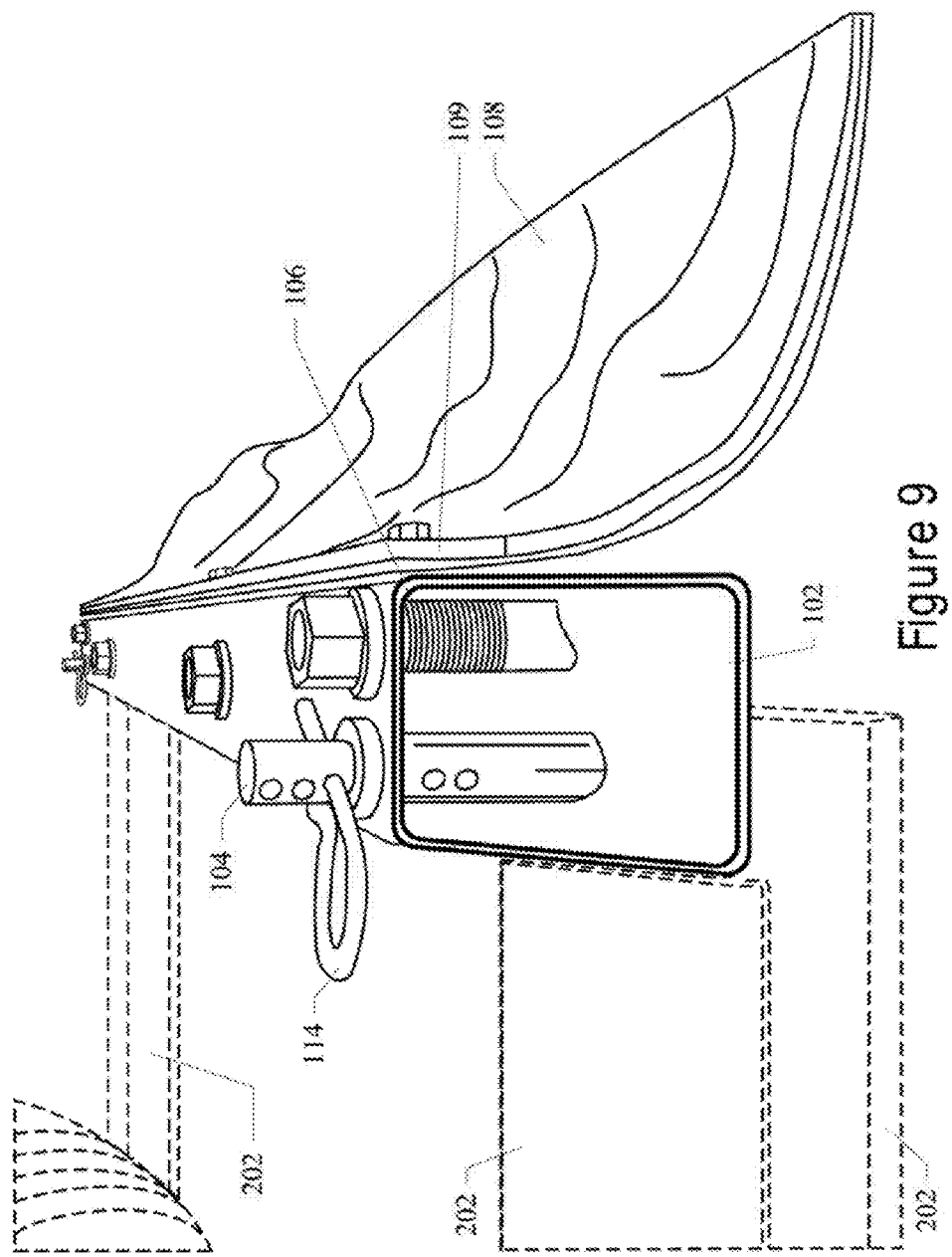
FIG. 9 illustrates a left side view of an example embodiment of the ground groomer as removably attached to a standard roping simulator.

FIG. 9 illustrates a left side view of an example embodiment 100 of the ground groomer as removably attached to a standard roping simulator. FIG. 9 shows the ground groomer 100 as attached to the skis 202 of the roping simulator using the attachment pins 104. Each attachment pin 104 can be inserted through a hole in the bottom of ski 202 of the roping simulator and through a corresponding hole(s) in the main support member 102. A cotter pin 114, with the retaining washer 115 described above, can be used to secure the attachment pin 104 in place as shown in FIG. 9. As the ground groomer 100 is towed across the practice area with the roping simulator 200 in the indicated direction of travel, the tines 106 dig into the surface of the around and scarify the surface. The flexible shield 108, attached to a rear surface of the main support member 102, drags behind the ground groomer 100 across the surface of the ground. The flexible shield 108 serves to smooth and flatten the scarified soil behind the tines 106 and to prevent debris from flying out behind the around groomer 100.

Figure 10:
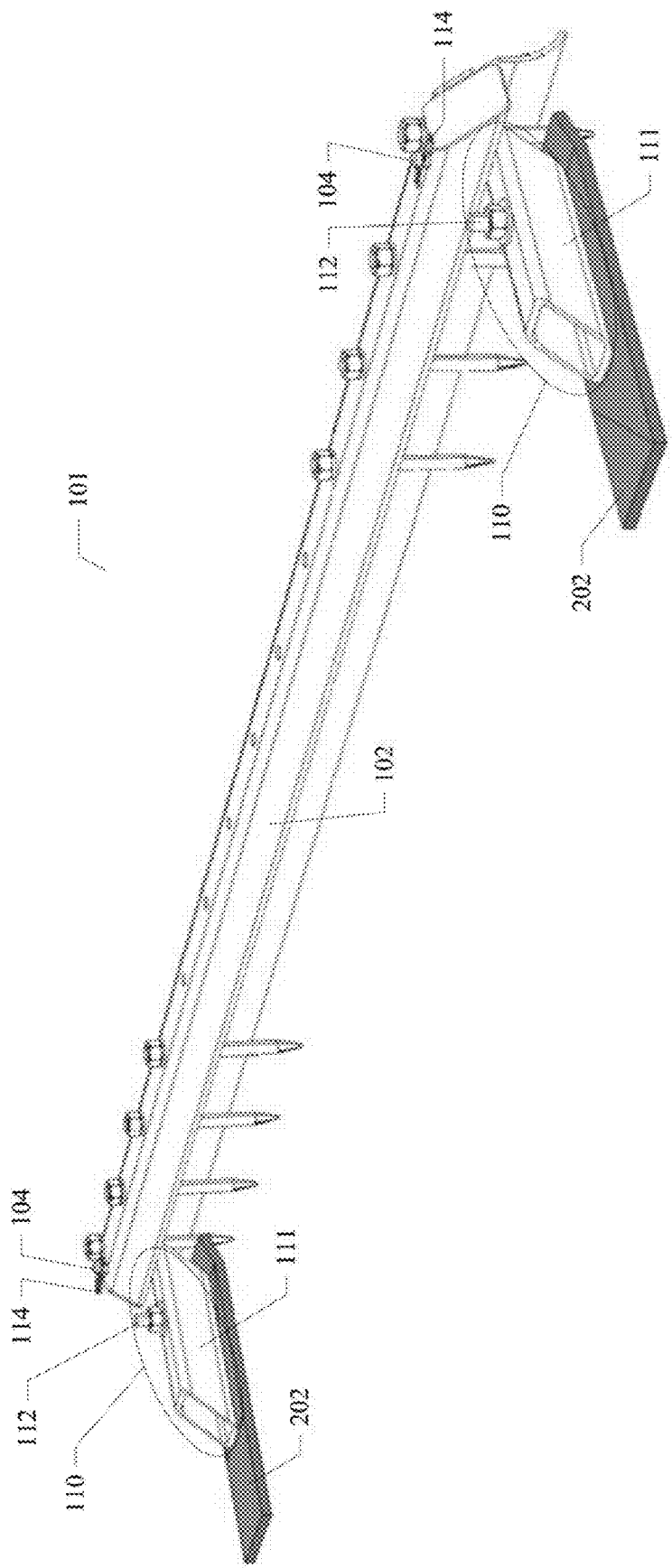
FIG. 10 illustrates a front isometric view of an example embodiment of the ground groomer configured for roping simulators with an alternative attachment mechanism.
Figure 11:
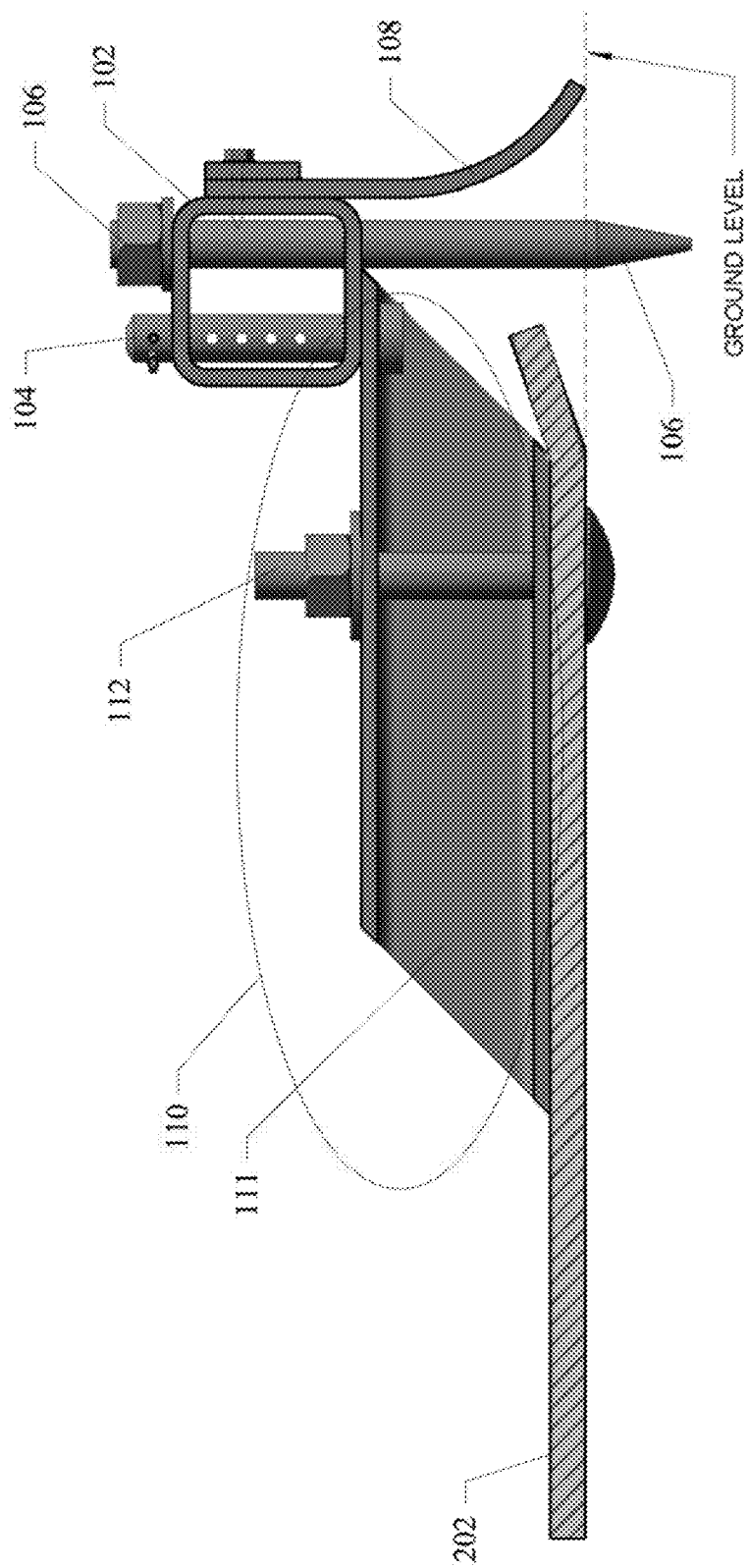
FIG. 11 illustrates a left side view of an example embodiment of the ground groomer configured for roping simulators with the alternative attachment mechanism.

FIG. 10 illustrates a front isometric view of an example embodiment 101 of the ground groomer configured for roping simulators with an alternative attachment mechanism. FIG. 11 illustrates a left side view of the example embodiment 101 of the ground groomer configured for roping simulators with the alternative attachment mechanism. As shown in FIGS. 10 and 11, an alternative attachment mechanism 110 includes a bracket 111, which is removably attached to a top surface of the ski 202 with a carriage bolt 112, a Tek™ screw, or the equivalent. The bolt 112 can be inserted through a hole in the bottom surface of the ski 202 and through a corresponding hole(s) in the bracket 111. The bolt 112 can secure the bracket 11 to the top surface of the ski 202 with a nut or other conventional securing mechanism. The top surface of the bracket 111 is configured with a hole in the to surface at one end, which can be aligned with a corresponding hole in the main support member 102 as shown in FIG. 11. The attachment pin 104 can be inserted through the hole in the bracket 111 and through the corresponding hole in the main support member 102. The cotter pin 114 can be used to secure the attachment pin 104 in place. As a result, the bracket 111 can be securely yet removably attached to the ski 202 and the ground groomer 101 can be securely yet removably attached to the bracket 111. Thus, the ground groomer 101 of an example embodiment can be configured for removable attachment to roping simulators with an alternative attachment mechanism. It will be apparent to those of ordinary skill in the art that in view of the disclosure provided herein, a variety of other equivalent attachment mechanisms can be used to attach a ground groomer directly to the skis or skids of a standard roping simulator.

In an example embodiment, the components of the ground groomer can be fabricated from standard steel or other rigid material components of a standard thickness and composition. The seams between components can be pre-fabricated or welded. The holes in the components as described can be drilled or pre-fabricated using well-known techniques. The attachable components of the ground groomer 100 can be attached using zinc-plated nuts and bolts, screws, rivets, cotter pins, or the like. The components of the ground groomer can be fabricated to be assembled on-site. The particular materials and dimensions can be selected for a particular application based on a variety of factors including the desired size, soil composition, materials costing, type of roping simulator, and the like.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", "front", "rear", "top", "bottom", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

Thus, a ground groomer configured for roping simulators is disclosed. While the present invention has been described in terms of several example embodiments, those of ordinary skill in the art can recognize that the present invention is not limited to the embodiments described, but can be practiced with modification and alteration within the spirit and scope of the appended claims. The description herein is thus to be regarded as illustrative instead of limiting.

What is claimed is:

1. An apparatus comprising:
   a generally horizontal main support member;
   a plurality of tines arranged to protrude through a lower surface of the main support member to scarify soil behind a roping simulator;
   brackets coupled to the main support member at locations aligned with a plurality of skis of the roping simulator, the brackets being configured for removable attachment to the skis of the roping simulator; and
   a plurality of attachment pins inserted generally orthogonally through holes in the brackets and holes in the main support member, the plurality of attachment pins removably coupling the main support member to the brackets, the plurality of attachment pins being further configured with a plurality of holes for adjustment of dig depth.

2. The apparatus as claimed in claim 1 further including a flexible rake attached to a rear surface of the main support member.

3. The apparatus as claimed in claim 1 wherein the plurality of attachment pins is configured to be secured with cotter pins.

4. The apparatus as claimed in claim 1 wherein the plurality of tines is configured to fit through holes in a top surface of the main support member and protrude through corresponding holes in the lower surface of the main support member.

5. The apparatus as claimed in claim 1 wherein the length of the plurality of tines can be varied to provide differing levels or depths of scarification.

6. The apparatus as claimed in claim 1 wherein the quantity of the plurality of tines can be varied to provide differing levels or patterns of scarification.

7. The apparatus as claimed in claim 1 wherein the generally horizontal main support member is configured as a rectangular tube.

8. The apparatus as claimed in claim 1 wherein the brackets are configured for removable attachment to a top surface of the skis.

9. The apparatus as claimed in claim 1 wherein at least one tine of the plurality of tines is positioned directly behind each of the skis of the roping simulator.

10. The apparatus as claimed in claim 1 further including a towable roping simulator with a frame having a body resembling livestock mounted thereon and adapted to provide a moving simulated target for roping practice, the frame including a plurality of skis, the brackets being removably coupled to the skis of the roping simulator.

11. An apparatus comprising:
a generally horizontal main support means;
a plurality of scarification means arranged to protrude through a lower surface of the main support means to scarify soil behind a roping simulator;
bracketing means coupled to the main support means at locations aligned with a plurality of skis of the roping simulator, the bracketing means being configured for removable attachment to the skis of the roping simulator; and
a plurality of attachment means inserted generally orthogonally through holes in bracketing means and holes in the main support means, the plurality of attachment means removably coupling the main support means to the bracketing means, the plurality of attachment means being further configured with a plurality of holes for adjustment of dig depth.

12. The apparatus as claimed in claim 11 further including a flexible raking means attached to a rear surface of the main support means.

13. The apparatus as claimed in claim 11 wherein the plurality of attachment means is configured to be secured with removable pinning means.

14. The apparatus as claimed in claim 11 wherein the plurality of scarification means is configured to fit through holes in a top surface of the main support means and protrude through corresponding holes in the lower surface of the main support means.

15. The apparatus as claimed in claim 11 wherein the length of the plurality of scarification means can be varied to provide differing levels or depths of scarification.

16. The apparatus as claimed in claim 11 wherein the quantity of the plurality of scarification means can be varied to provide differing levels or patterns of scarification.

17. The apparatus as claimed in claim 11 wherein the generally horizontal main support means is configured as a rectangular tube.

18. The apparatus as claimed in claim 11 wherein the bracketing means are configured for removable attachment to a top surface of the skis.

19. The apparatus as claimed in claim 11 wherein at least one scarification means of the plurality of scarification means is positioned directly behind each of the skis of the roping simulator.

20. The apparatus as claimed in claim 11 further including a towable roping simulator with a frame having a body resembling livestock mounted thereon and adapted to provide a moving simulated target for roping practice, the frame including a plurality of skis, the bracketing means being removably coupled to the skis of the roping simulator.

21. An apparatus comprising:
a towable roping simulator with a frame having a body resembling livestock mounted thereon and adapted to provide a moving simulated target for roping practice, the frame including a plurality of skis; and
a ground groomer having a main support member and a plurality of tines protruding therefrom to scarify soil behind the roping simulator when towed, the ground groomer being removably coupled directly to the plurality of skis of the roping simulator without intervening structure.

* * * * *